United States Patent
Sohm

(10) Patent No.: US 8,627,049 B2
(45) Date of Patent: Jan. 7, 2014

(54) REAL-TIME PRIORITIZATION OF STALL OR EVENT INFORMATION

(75) Inventor: Oliver P. Sohm, Toronto (CA)

(73) Assignee: Texas Instruments Incorporated, Dallas, TX (US)

( * ) Notice: Subject to any disclaimer, the term of this patent is extended or adjusted under 35 U.S.C. 154(b) by 1299 days.

(21) Appl. No.: 11/383,465

(22) Filed: May 15, 2006

(65) Prior Publication Data

US 2006/0259664 A1    Nov. 16, 2006

Related U.S. Application Data

(60) Provisional application No. 60/681,427, filed on May 16, 2005, provisional application No. 60/681,551, filed on May 16, 2005.

(51) Int. Cl.
   *G06F 11/30*    (2006.01)

(52) U.S. Cl.
   USPC .......................................................... 712/227

(58) Field of Classification Search
   USPC .......................................................... 714/47
   See application file for complete search history.

(56) References Cited

U.S. PATENT DOCUMENTS

| | | | | |
|---|---|---|---|---|
| 5,657,253 A | * | 8/1997 | Dreyer et al. | 702/186 |
| 5,751,945 A | * | 5/1998 | Levine et al. | 714/47 |
| 5,768,152 A | * | 6/1998 | Battaline et al. | 702/186 |
| 6,112,318 A | * | 8/2000 | Jouppi et al. | 714/47 |
| 6,134,676 A | * | 10/2000 | VanHuben et al. | 714/39 |
| 6,170,032 B1 | * | 1/2001 | Izzard | 710/244 |
| 2001/0039488 A1 | * | 11/2001 | Swoboda | 703/17 |
| 2001/0047253 A1 | * | 11/2001 | Swoboda | 703/26 |
| 2003/0229823 A1 | * | 12/2003 | Swaine et al. | 714/25 |
| 2005/0034026 A1 | * | 2/2005 | Swaine et al. | 714/43 |
| 2005/0102460 A1 | * | 5/2005 | Wahler | 710/269 |

OTHER PUBLICATIONS

"MM74HC148 8-3 Line Priority Encoder" Fairchild Semiconductor 1987/2001.*
CoreSight v1.0 Architecture Specification—ARM, Sep. 2004.*

* cited by examiner

*Primary Examiner* — Keith Vicary
(74) *Attorney, Agent, or Firm* — Robert D. Marshall, Jr.; W. James Brady; Frederick J. Telecky, Jr.

(57) ABSTRACT

Disclosed herein is a system and method for executing a series of instructions on a circuit. The system comprises an encoder that receives event data corresponding to the executed instructions. The encoder groups the event data into one or more groups and outputs the highest priority event for each such group.

2 Claims, 5 Drawing Sheets

REAL-TIME PRIORITIZATION OF STALL OR EVENT INFORMATION

CROSS-REFERENCE TO RELATED APPLICATIONS

This application claims the benefit of U.S. Provisional Application Ser. No. 60/681,551, filed May 16, 2005, titled "Emulation/Debugging with Real-Time System Control," and U.S. Provisional Application Ser. No. 60/681,427, filed May 16, 2005, titled "Debugging Software-Controlled Cache Coherence," both of which are incorporated by reference herein as if reproduced in full below.

This application also may contain subject matter that may relate to the following commonly assigned co-pending applications incorporated herein by reference: "Real-Time Monitoring, Alignment, and Translation of CPU Stalls or Events," Ser. No. 11/383,361, filed May 15, 2006, "Event and Stall Selection," Ser. No. 11/383,389, filed May 15, 2006, "Watermark Counter With Reload Register," Ser. No. 11/383,464, filed May 15, 2006, "Method of Translating System Events Into Signals For Activity Monitoring," Ser. No. 11/383,466, filed May 15, 2006, "System and Methods For Stall Monitoring," Ser. No. 11/383,472, filed May 15, 2006, "Monitoring of Memory and External Events," Ser. No. 11/383,473, filed May 15, 2006, "Event-Generating Instructions," Ser. No. 11/383,433, filed May 15, 2006, and "Selectively Embedding Event-Generating Instructions," Ser. No. 11/383,438, filed May 15, 2006.

BACKGROUND

Integrated circuits are ubiquitous in society and can be found in a wide array of electronic products. Regardless of the type of electronic product, most consumers have come to expect greater functionality when each successive generation of electronic products are made available because successive generations of integrated circuits offer greater functionality such as faster memory or microprocessor speed. Moreover, successive generations of integrated circuits that are capable of offering greater functionality are often available relatively quickly. For example, Moore's law, which is based on empirical observations, predicts that the speed of these integrated circuits doubles every eighteen months. As a result, integrated circuits with faster microprocessors and memory are often available for use in the latest electronic products every eighteen months.

Although successive generations of integrated circuits with greater functionality and features may be available every eighteen months, this does not mean that they can then be quickly incorporated into the latest electronic products. In fact, one major hurdle in bringing electronic products to market is ensuring that the integrated circuits, with their increased features and functionality, perform as desired. Generally speaking, ensuring that the integrated circuits will perform their intended functions when incorporated into an electronic product is called "debugging" the electronic product. Also, determining the performance, resource utilization, and execution of the integrated circuit is often referred to as "profiling". Profiling is used to modify code execution on the integrated circuit so as to change the behavior of the integrated circuit as desired. The amount of time that debugging and profiling takes varies based on the complexity of the electronic product. One risk associated with the process of debugging and profiling is that it delays the product from being introduced into the market.

To prevent delaying the electronic product because of delay from debugging and profiling the integrated circuits, software based simulators that model the behavior of the integrated circuit are often developed so that debugging and profiling can begin before the integrated circuit is actually available. While these simulators may have been adequate in debugging and profiling previous generations of integrated circuits, such simulators are increasingly unable to accurately model the intricacies of newer generations of integrated circuits. Further, attempting to develop a more complex simulator that copes with the intricacies of integrated circuits with cache memory takes time and is usually not an option because of the preferred short time-to-market of electronic products. Unfortunately, a simulator's inability to effectively model integrated circuits results in the integrated circuits being employed in the electronic products without being debugged and profiled fully to make the integrated circuit behave as desired.

SUMMARY

Disclosed herein is a system and method for executing a series of instructions on a circuit. An encoder receives event data corresponding to the executed instructions, wherein the encoder groups the event data into one or more groups and outputs the highest priority event for each group.

BRIEF DESCRIPTION OF THE DRAWINGS

For a detailed description of exemplary embodiments of the invention, reference will now be made to the accompanying drawings in which.

DETAILED DESCRIPTION

Figure 1:
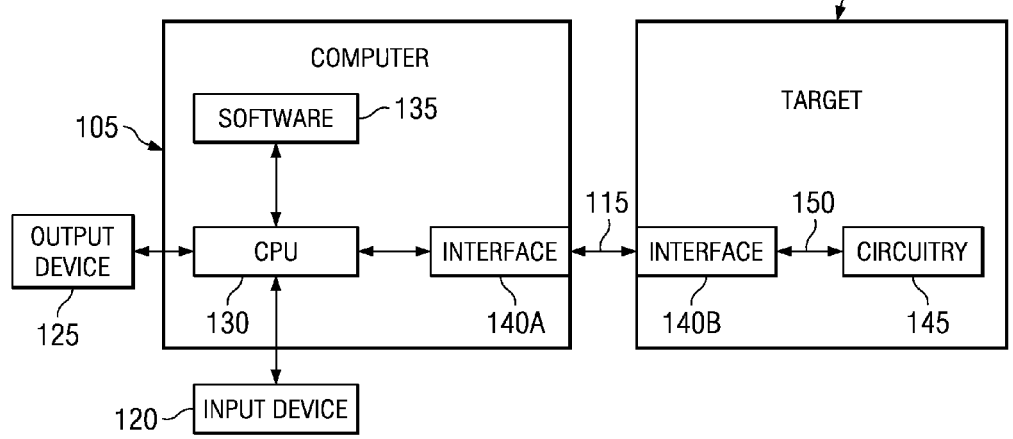
FIG. 1 depicts an exemplary debugging and profiling system in accordance with a preferred embodiment of the invention.

FIG. 1 depicts an exemplary debugging and profiling system 100 including a host computer 105 coupled to a target device 110 through a connection 115. A user may debug and profile the operation of the target device 110 by operating the host computer 105. The target device 110 may be debugged and profiled in order for the operation of the target device 110 to perform as desired (for example, in an optimal manner) with circuitry 145. To this end, the host computer 105 may include an input device 120, such as a keyboard or mouse, as well as an output device 125, such as a monitor or printer. Both the input device 120 and the output device 125 couple to a central processing unit 130 (CPU) that is capable of receiving commands from a user and executing software 135 accordingly. Software 135 interacts with the target 110 and may allow the debugging and profiling of applications that are being executed on the target 110.

Connection 115 couples the host computer 105 and the target device 110 and may be a wireless, hard-wired, or optical connection. Interfaces 140A and 140B may be used to interpret data from or communicate data to connection 115 respectively according to any suitable data communication method. Connection 150 provides outputs from the circuitry 145 to interface 140B. As such, software 135 on host computer 105 communicates instructions to be implemented by circuitry 145 through interfaces 140A and 140B across connection 115. The results of how circuitry 145 implements the instructions is output through connection 150 and communicated back to host computer 105. These results are analyzed on host computer 105 and the instructions are modified so as to debug and profile applications to be executed on target 110 by circuitry 145.

Connection 150 may be a wireless, hard-wired, or optical connection. In the case of a hard-wired connection, connection 150 is preferably implemented in accordance with any suitable protocol such as a Joint Testing Action Group (JTAG) type of connection. Additionally, hard-wired connections may include a real time data exchange (RTDX) type of connection developed by Texas instruments, Inc. Briefly put, RTDX gives system developers continuous real-time visibility into the applications that are being implemented on the circuitry 145 instead of having to force the application to stop, via a breakpoint, in order to see the details of the application implementation. Both the circuitry 145 and the interface 140B may include interfacing circuitry to facilitate the implementation of JTAG, RTDX, or other interfacing standards.

The target 110 preferably includes the circuitry 145 executing code that is actively being debugged and profiled. In some embodiments, the target 110 may be a test fixture that accommodates the circuitry 145 when code being executed by the circuitry 145 is being debugged and profiled. The debugging and profiling may be completed prior to widespread deployment of the circuitry 145. For example, if the circuitry 145 is eventually used in cell phones, then the executable code may be designed using the target 110.

The circuitry 145 may include a single integrated circuit or multiple integrated circuits that will be implemented as part of an electronic device. For example, the circuitry 145 may include multi-chip modules comprising multiple separate integrated circuits that are encapsulated within the same packaging. Regardless of whether the circuitry 145 is implemented as a single-chip or multiple-chip module, the circuitry 145 may eventually be incorporated into an electronic device such as a cellular telephone, a portable gaming console, network routing equipment, etc.

Debugging and profiling the executable firmware code on the target 110 using breakpoints to see the details of the code execution is an intrusive process and affects the operation and performance of the code being executed on circuitry 145. As such, a true understanding of the operation and performance of the code execution on circuitry 145 is not gained through the use of breakpoints.

Figure 2:
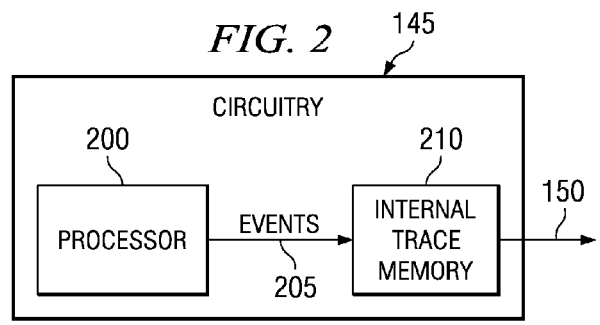
FIG. 2 depicts an embodiment of circuitry where code is being debugged and profiled using a trace.

FIG. 2 depicts an embodiment of circuitry 145 where code is being debugged and profiled using a trace on circuitry 145 to monitor events. Circuitry 145 includes a processor 200 which executes the code. Through the operation of the processor 200 many events 205 may occur that are significant for debugging and profiling the code being executed by the processor 200. The term "events" or "event data" herein is being used broadly to describe any type of stall in which processor 200 is forced to wait before it can complete executing an instruction, such as a CPU stall or cache stall; any type of memory event, such as a read hit or read miss; and any other occurrences which may be useful for debugging and profiling the code being executed on circuitry 145. The internal trace memory 210 records the events 205 as event data and outputs the event data through connection 150 to computer 105. This enables a user of the computer 105 to see how the execution of the code is being implemented on circuitry 145.

As successive generations of processors are developed with faster speeds, the number of events occurring on a processor such as processor 200 similarly increases, however, the bandwidth between computer 105 and circuitry 145 through connection 150 is limited. The amount of event data 205 recorded using a trace may exceed the bandwidth of connection 150. As such, for this solution to be implemented a trace may only be run for a very limited amount of time so as to not fill up internal trace memory 210. This situation is analogous to a sink that drains much less water than the faucet is putting into the sink. In order to prevent the sink from overflowing the faucet may only be turned on for a limited amount of time. This solution of only running the trace for a very short time may not be preferable since it would give a very limited view of the execution of the code on circuitry 145. Alternatively, internal trace memory 210 may be very large so as to accommodate the large amount of event data. This may not be preferable either, since trace memory 210 would then take up a large area on circuitry 145 and consume more power.

Figure 3:
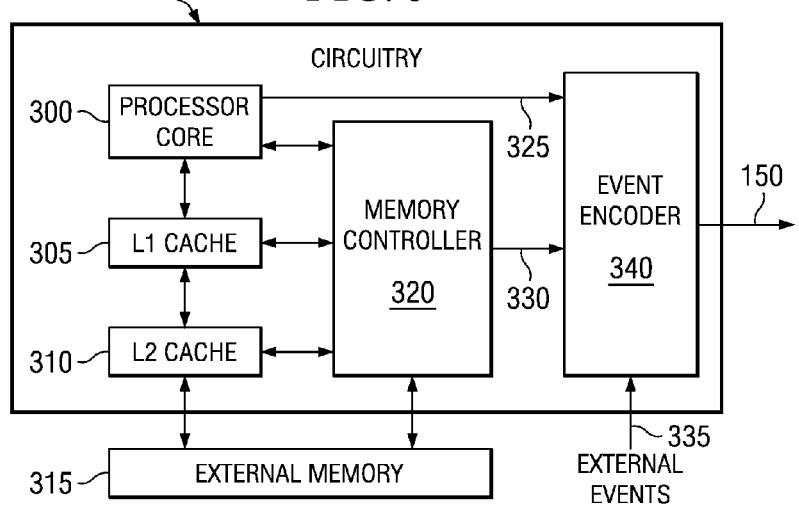
FIG. 3 depicts a preferred embodiment of circuitry where code is being debugged and profiled using a trace.

As such, intelligent ways of reducing the amount of event data without losing any or much information are desirable. FIG. 3 discloses another embodiment of circuitry 145 where code is being debugged and profiled using a trace on circuitry 145 to monitor events. Circuitry 145 includes a processor core 300 which executes the code. Processor 300 interacts with memory controller 320 in order to input data and instructions from various levels of a memory subsystem and output data manipulated according to the instructions. The memory subsystem may include an L1 cache memory 305, which may be divided into a program portion of L1 cache and a data portion of L1 cache; an L2 cache memory 310, which may be larger and slower than the L1 cache memory; and an external memory 315, which may be a random access memory (RAM), or any other suitable external storage. Through executing the code, stalls may occur in the processor core 300 wherein stall signals indicating that these stalls occurred are output from processor core 300 to event encoder 340 through connection 325. Stalls occur when the processor core 300 is forced to wait before it can complete executing an instruction. Stalls can occur for a wide variety of reasons, for example if the processor core 300 has to wait while a data element is being fetched or if the processor core 300 has to wait while an area in cache is being freed up to write the result of an instruction.

Memory controller 320 outputs memory events 330 to event encoder 340. Memory events can also occur for a wide variety of reasons, for example a read hit on the L1 cache 305 or a read miss on the L1 cache 305. Note that certain memory events 330 may also cause a stall, but not all memory events cause a stall. For example a read miss on the L1 cache 305 will also cause a stall until the data that is needed is forwarded to the L1 cache 305. A read hit is an example of a memory event that would not cause a stall.

External events 335 may also be input to event encoder 340. External events 335 may include interrupt routines executed on processor core 300 for interacting with external devices. Monitoring these external events enables a user of computer 105 for example to determine the real-time deadlines for executing the interrupt routines. Event encoder 340 combines and/or selectively outputs the various event data to computer 105 through connection 150. The encoded event data that is sent to computer 105 is decoded and interpreted in order to enable a user on computer 105 to debug and profile the execution of code on circuitry 145. Related application U.S. Ser. No. 11/383,466, filed May 15, 2006, "Method of Translating System Events into Signals for Activity Monitoring", by Swoboda et al. details an exemplary process for decoding the event data on computer 105. The content of the above referenced application is herein incorporated by reference in its entirety.

Figure 4:
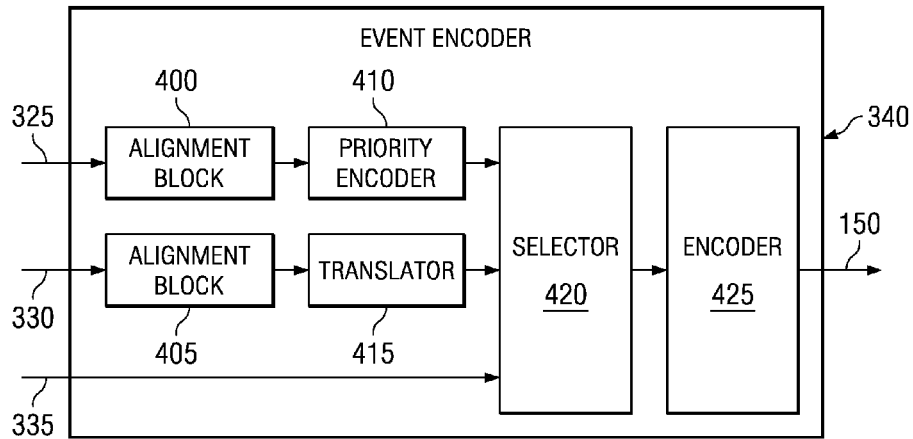
FIG. 4 depicts an example of an implementation of an event encoder.

FIG. 4 depicts an example of an implementation of event encoder 340. Event encoder 340 includes alignment blocks 400 and 405, a stall priority encoder 410, an event translator 415, a selector 420, and a data encoder 425. In the embodiment of FIG. 4, alignment blocks 400 and 405 are used for aligning an event to the instruction where the event occurred. Such alignment enables a causal relationship to be determined between code execution and the stalls or events of interest. Priority encoder 410 is used to prioritize groups of stalls for cases where multiple stalls occur simultaneously. In at least one embodiment, only the stall with the highest priority in a particular group is output. Translator 415 is used to group events with common characteristics. Selector 420 selects one of the output from priority encoder 410, the output from translator 415, or the external event 335 input to be provided to encoder 425. Encoder 425 combines or compresses the data selected by selector 420. For example, encoder 425 may include one or more counters to count a number of events occurring within a particular time period. Related application U.S. Ser. No. 11/383,464, filed May 15, 2006, "Watermark Counter with Reload Register", by Swoboda et al. details one such counter implementation. The content of the above referenced application is herein incorporated by reference in its entirety. Encoder 425 may also include standard bit reduction techniques such as Huffman Coding, or any other suitable bit reduction method. Related application U.S. Ser. No. 11/383,361, filed May 15, 2006, "Real-Time Monitoring, Alignment, and Translation of CPU Stalls or Events", by Sohm et al. details an implementation of alignment blocks 400 or 405. The content of the above referenced application is herein incorporated by reference in its entirety.

Figure 5:
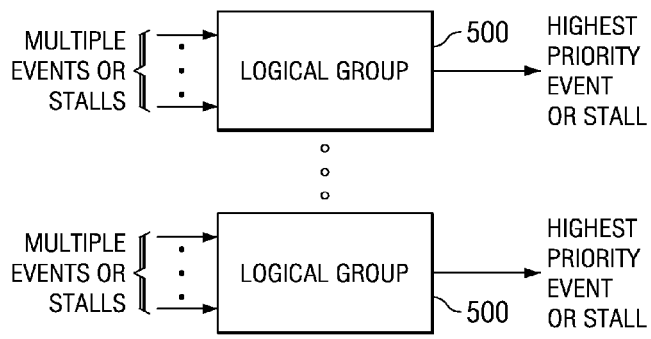
FIG. 5 depicts a preferred implementation of a priority encoder.

FIG. 5 depicts an implementation of priority encoder 410. In particular, for priority encoder 410, the aligned stalls are organized into different logical groups 500 depending on the type of stall in order to set priorities for which stall to output if multiple stalls occur simultaneously. Some logical groups may include stalls caused by architectural delays (e.g., CPU architectural stalls), memory access conflicts (e.g., L1 cache stalls indicating a snoop conflict), memory access delays (e.g., L1 cache stalls indicating cache line fills), memory access ordering (e.g., L1 cache stalls indicating a write buffer flush on a read miss), or logical groups may be organized by any other category or algorithm. The logical groups may be mutually exclusive groups of stall or overlapping groups of stalls. Each logical group would output only one signal so as to communicate the highest priority event of that group. By grouping signals with common characteristics, the most important signal causing an event or stall may be identified and given precedence over any other stall or event occurring simultaneously. This gives added clarity to a developer by showing the root cause of a stall or event. By only outputting the highest priority event or stall for each logical group, less bandwidth is needed to communicate the event information that might otherwise be needed. In addition to bandwidth reduction benefits, by prioritizing the stalls, more meaning may be extracted from the stall signals.

For example, if a read miss occurs then the dirty line in cache may be evicted and replaced with the desired data. This dirty line in cache is referred to as a victim and may be written back to a higher level in memory. As such, two stalls occur simultaneously. One stall indicating a read miss and another stall indicating a victim write-back. If both of these stall types are grouped together and the victim write-back stall is given a higher priority then each of these stalls will be seen as separate stalls. In particular, first the victim write-back stall would be asserted until the dirty line in cache is written back to a higher level in memory. If the victim write-back stall is being monitored then a determination can be made as to the efficiency of a victim write-back. When the victim write-back stall is no longer asserted the read miss stall would become visible until the data needed is written in the dirty line in cache. As such, instead of a read miss stall indicating the entire duration of the victim write-back and the time to fill the line in cache, by prioritizing the stalls the read miss gains a new meaning. In particular, the read miss stall indicates the duration of time to fill the line in cache, or a line fill stall. As such, by prioritizing groups of stalls new meaning and detail may be provided for each stall signal.

Figure 6:
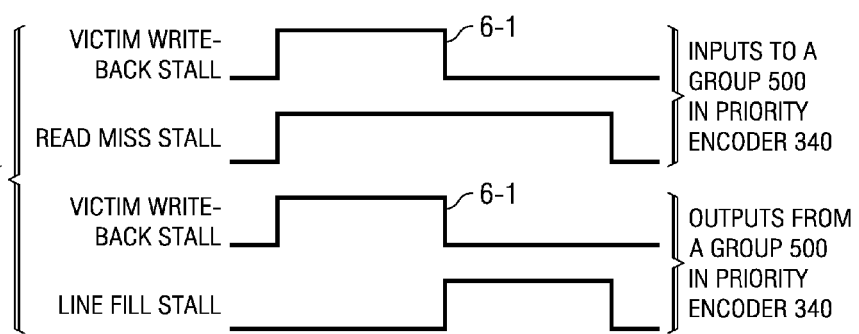
FIG. 6 depicts the inputs and outputs of a logical group 500.

FIG. 6 depicts the inputs and outputs from a logical group 500 of priority encoder 340 in the example above with a victim write-back stall and a read stall occurring simultaneously. As shown in FIG. 6, both stalls are initially asserted on the input of a logical group 500. At time 6-1 the victim write-back stall is no longer asserted and only the read miss stall remains asserted. If the victim write-back stall is given higher priority than the read miss stall then initially the output of the logical group 500 is asserted for the victim write-back stall. Note that the read miss stall is masked at the output since it has a lower priority and only the highest priority stall signal is output at any one time. As such, at time 6-1 the victim write-back stall is no longer asserted a line fill stall is determined to be the highest priority stall signal and as such is output from the logical group 500. Note that as described in the example above, the read miss stall takes on new meaning to indicate a line fill stall. Since only the highest priority event is asserted at the output of each logical group 500, then any other lower priority events are not double-counted.

Figure 7A:
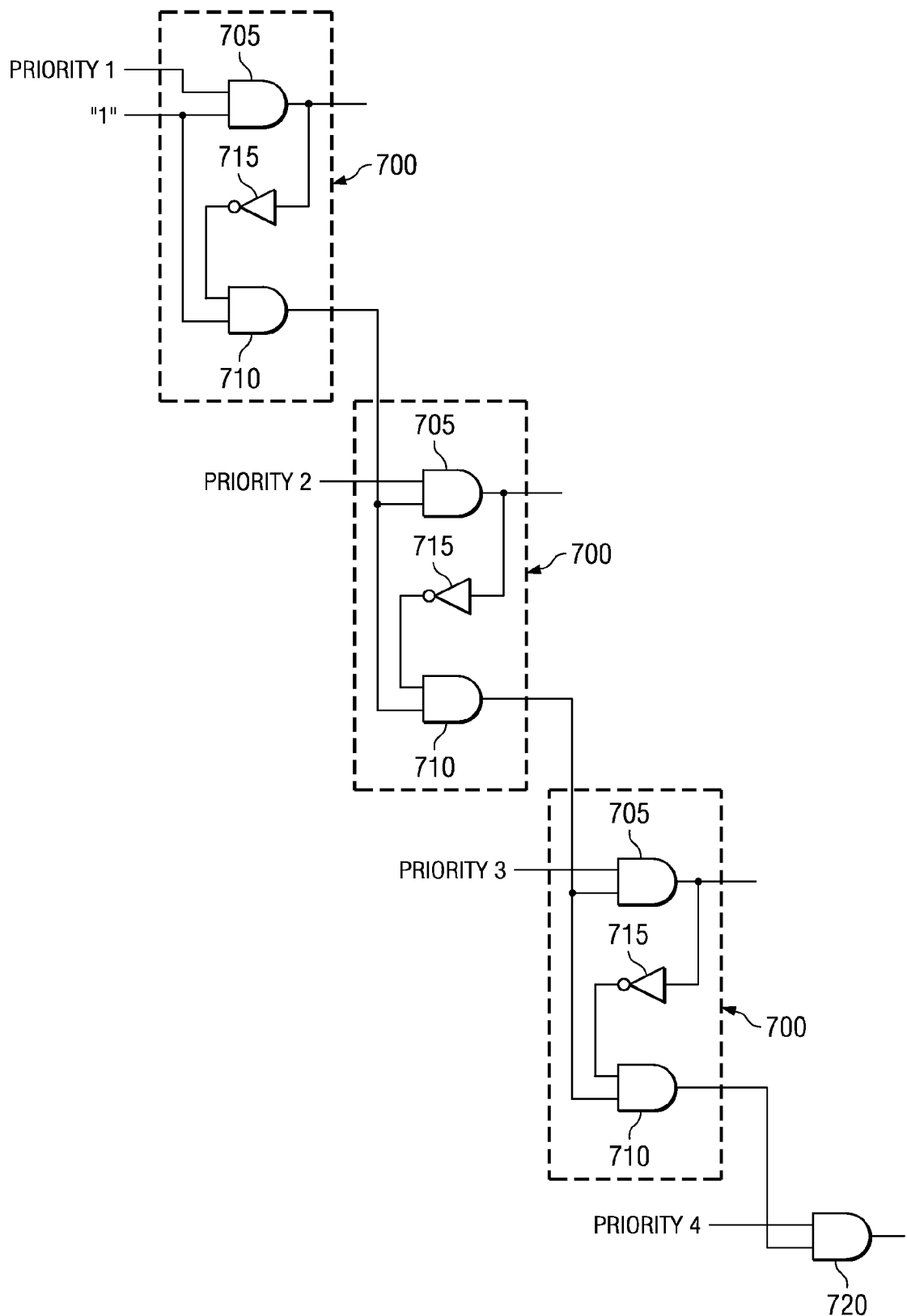
FIG. 7A depicts an implementation of any of the groups shown in FIG. 5 for prioritizing the input events.
Figure 7B:
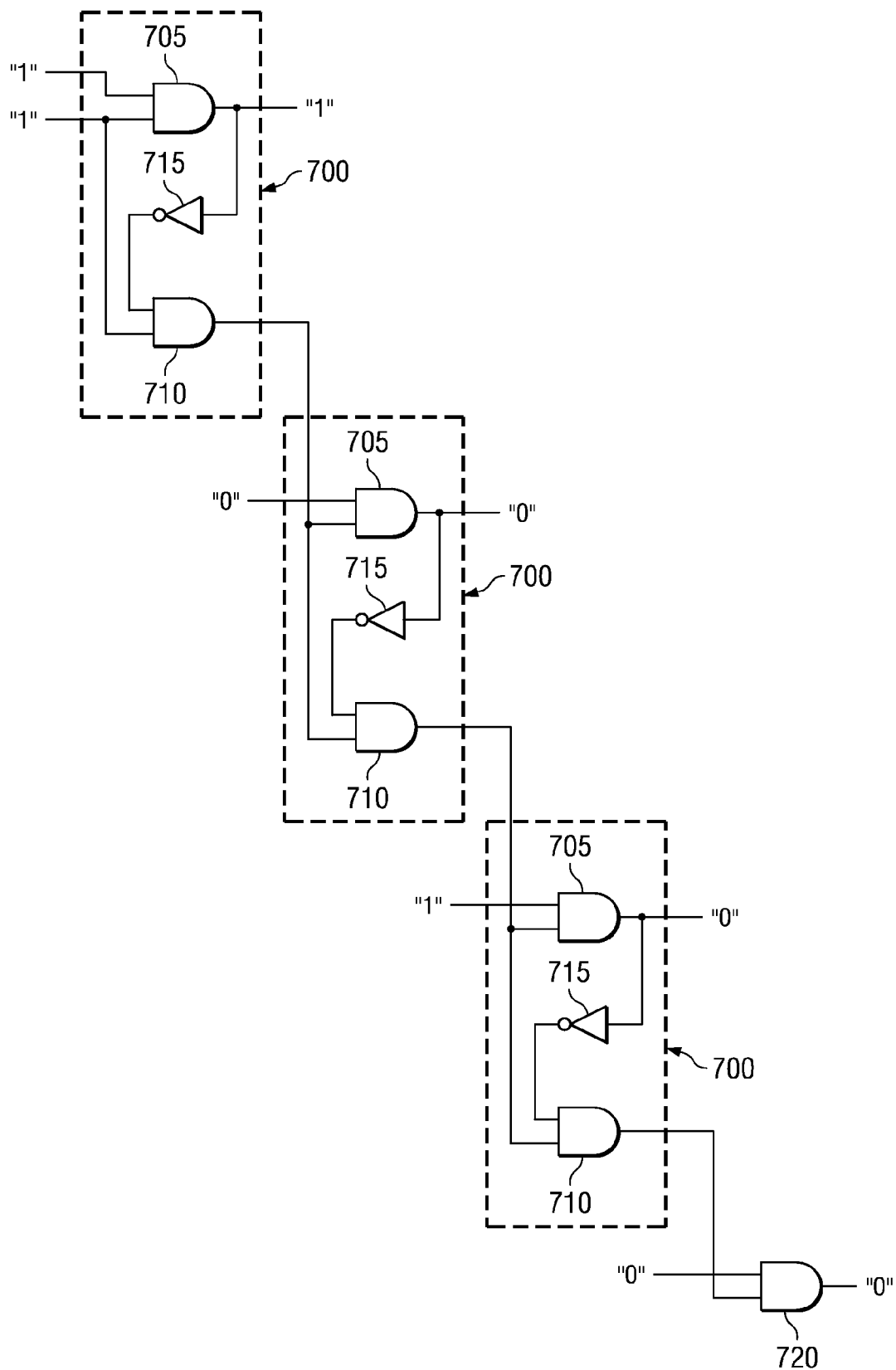
FIG. 7B depicts an example of the operation of FIG. 7A.
Figure 7C:
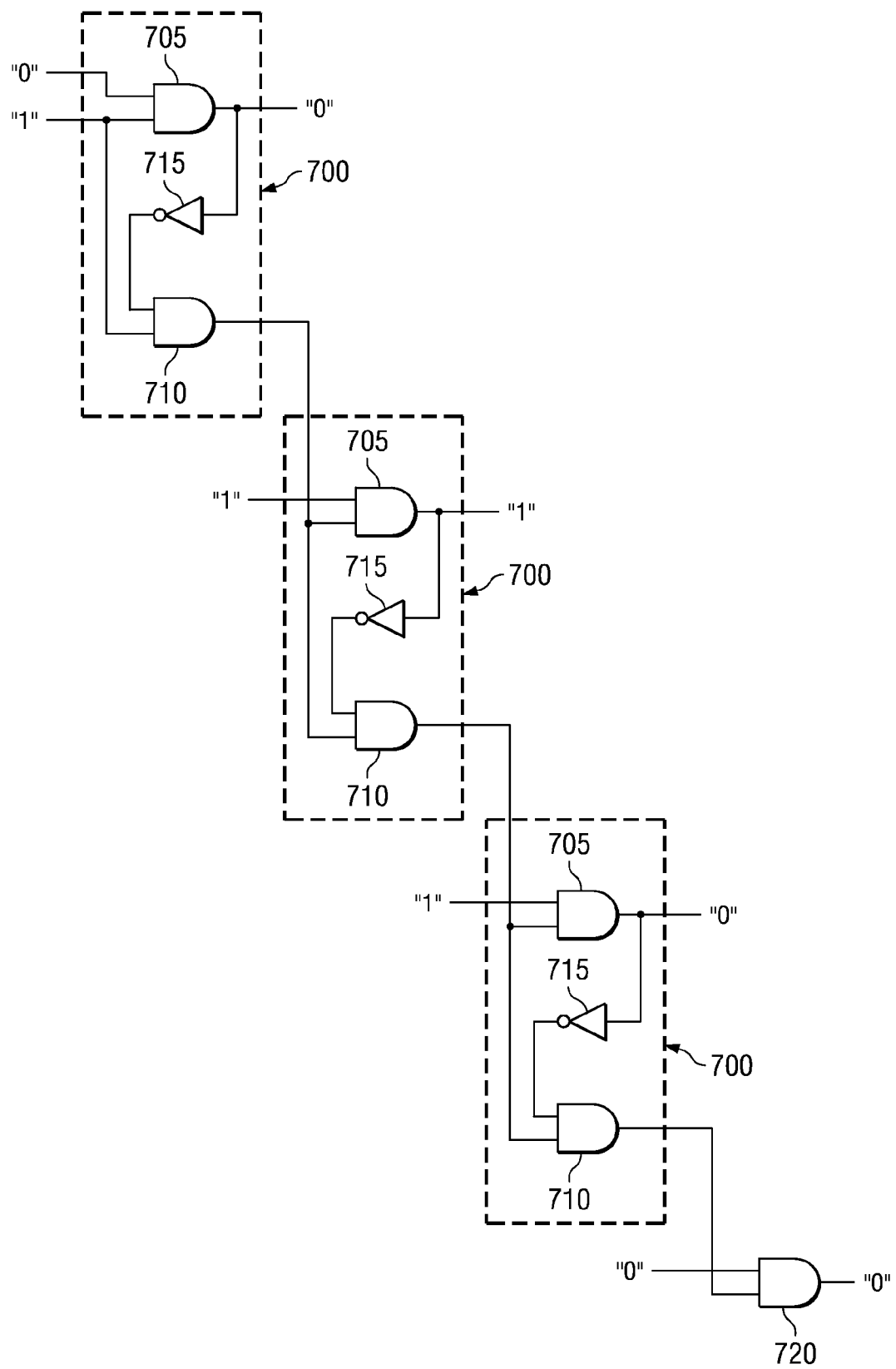
FIG. 7C depicts an example of the operation of FIG. 7A.

FIG. 7A depicts a priority encoder implementation of any logical group 500. FIG. 7A includes a series of logic blocks 700 where the output from one block is provided as an input to the next. The logic block 700 at the top has the highest priority and the logic block 700 at the bottom has the lowest priority. Each logic block 700 outputs a logical combination of inputs such that if multiple events occur simultaneously, only the highest priority event is visible on the output. In a preferred embodiment, each logic block 700 includes two AND gates 705 and 710 as well as an inverter 715. An AND gate produces a logical ANDing of the inputs to the AND gate. An inverter produces a logical inversion of the input to the inverter. In particular, a logical "1" value is input to both AND gates 705 and 710 of the first logic block 700. AND gate 705 also receives an input from the highest priority event signal. The highest priority event signal indicates whether or not the highest priority event has occurred. A logical "1" would be input to AND gate 705 if the event occurred and a logical "0" would be input to AND gate 705 if the event did not occur. As such, the first logic block 700 will output a value of "0" if the input from the highest priority event signal is "0" since the logical ANDing of a "0" and a "1" produces a "0". Logic block 700 would produce a value of "1" if the input from the highest priority event signal is "1" since the logical ANDing of a "1" and a "1" produces a "1". An inverter 715 inverts whatever signal is output from AND gate 705 and inputs the result as another input to AND gate 710. The output from AND gate 710 from the first logic block 700 is fed into the inputs of AND gates 705 and 710 for the next logic block 700. Each successive logic block 700 receives one input from the next lowest priority event signal and another input from the output of AND gate 710 from the previous logic block 700. For the lowest priority event signal a simple AND gate 720 is used to logically AND the values from the lowest priority event signal and the output of AND gate 710 from the previous logic block 700. FIGS. 7B and 7C illustrate the operation of the operation of the priority encoder.

FIG. 7B depicts the operation of the priority encoder where the highest priority event is occurring simultaneously with third priority event. As illustrated, AND gate 705 produces a "1" output because of the two "1" inputs. Inverter 715 inverts the "1" output from AND gate 705 to produce a "0" input for AND gate 710, therefore AND gate 710 produces a "0" output to the second logic block 700. Both AND gates 705 and 710 for the second logic block receive the "0" input and therefore in turn produce a "0" output. The "0" output from AND gate 710 in the second logic block is input to the third logic block. Similarly, Both AND gates 705 and 710 for the third logic block receive the "0" input and therefore in turn produce a "0" output. Note that even though a "1" is input from the third priority event signal, the logical ANDing of a "0" and a "1" produces a "0". As such, the event occurring on the third priority event signal is masked by the higher priority event occurring on the highest priority event signal. The "0" output from AND gate 710 in the third logic block is fed into AND gate 720 to also produce a "0" output.

FIG. 7C depicts the operation of the priority encoder where the second priority event is occurring simultaneously with third priority event. As illustrated, AND gate 705 produces a "0" output because of the "0" input from the highest priority event signal. Inverter 715 inverts the "0" output from AND gate 705 to produce a "1" input for AND gate 710, therefore AND gate 710 produces a "1" output to the second logic block 700. Both AND gates 705 and 710 for the second logic block receive the "1" input. AND gate 705 for the second logic block 700 produces a "1" output because of the two "1" inputs. Inverter 715 for the second logic block 700 inverts the "1" output from AND gate 705 to produce a "0" input for AND gate 710 of the second logic block 700, therefore AND gate 710 produces a "0" output to the third logic block 700. The "0" output from AND gate 710 in the second logic block is input to the third logic block. Both AND gates 705 and 710 for the third logic block receive the "0" input and therefore in turn produce a "0" output. Note that even though a "1" is input from the third priority event signal, the logical ANDing of a "0" and a "1" produces a "0". As such, the event occurring on the third priority event signal is masked by the higher priority event occurring on the second priority event signal. The "0" output from AND gate 710 in the third logic block is fed into AND gate 720 to also produce a "0" output. As such, the priority encoder only outputs the highest priority event if multiple events in a group occur simultaneously. Since only the highest priority event is asserted then any other lower priority events are not double-counted.

Disclosed above is a system and method of tracing a group of processor events in real-time in order to enable a programmer to debug and profile the operation and execution of code on the processor. The events are fed into an event encoder where they are grouped together and prioritized where the highest priority event for each group is output.

While various system and method embodiments have been shown and described herein, it should be understood that the disclosed systems and methods may be embodied in many other specific forms without departing from the spirit or scope of the invention. The present examples are to be considered as illustrative and not restrictive. The intention is not to be limited to the details given herein, but may be modified within the scope of the appended claims along with their full scope of equivalents.

What is claimed is:

1. A system comprising:
a circuit configured to execute a series of instructions, said circuit including a cache memory, said cache memory generating a cache miss stall triggered upon a read miss into said cache memory and a corresponding victim eviction stall triggered if said cache miss stall causes a writeback of a dirty cache entry to be replaced with new data in said cache memory; and
an encoder configured to receive event data corresponding to the executed series of instructions, said event data describes at least processor stalls including said cache miss stall and said victim eviction stall, said encoder grouping the received event data into a plurality of groups, outputting a highest priority event for each group as prioritized event data and providing said highest priority event of each group to a computer external to said system, said encoder grouping said cache miss stall and said corresponding victim eviction stall into one of said plurality of groups and assigning a lower priority to said cache miss stall than to said corresponding victim eviction stall.

2. A method comprising:
executing a series of instructions in a target device; and
encoding event data corresponding to the executed series of instructions, said event data describing at least processor stalls including a cache miss stall triggered upon a read miss into a cache memory and a corresponding victim eviction stall triggered if said cache miss stall causes a writeback of a dirty cache entry to be replaced with new data in the cache memory;
said encoding step including grouping event data into a plurality of groups and outputting a highest priority event for each group as prioritized event data;
said encoding step further including grouping said cache miss stall and said corresponding victim eviction stall into one of said plurality of groups and assigning a higher priority to said corresponding victim eviction stall than to said cache miss stall; and
transmitting said highest priority event of each group to a computer external to said target device.

* * * * *